3,489,797
PRODUCTION OF CARBAMYL CHLORIDES AND BROMIDES FROM CORRESPONDING N-(α-CHLOROALKYL OR α - BROMOALKYL) - CARBAMYL HALIDES
Karl-Heinz Koenig and Horst Pommer, Ludwigshafen (Rhine), Germany, assignors to Badische Anilin- & Soda-Fabrik Aktiengesellschaft, Ludwigshafen (Rhine), Germany
No Drawing. Continuation-in-part of application Ser. No. 436,913, Mar. 3, 1965. This application Mar. 20, 1968, Ser. No. 714,409
Claims priority, application Germany, Mar. 7, 1964, B 75,782; Oct. 7, 1964, B 78,823; Jan. 12, 1965, B 80,076; Jan. 16, 1965, B 80,146; Feb. 9, 1965, 1,269,611
Int. Cl. C07c *51/58, 53/30*
U.S. Cl. 260—544                    1 Claim

ABSTRACT OF THE DISCLOSURE

Process for producing carbamyl halides in which an N-(α-haloalkyl)-carbamyl halide is reacted with a compound having a labile hydrogen atom at a temperature of −40° C. to +150° C. so as to selectively substitute the halogen atom in the α-position. The resulting products are useful intermediates for the production of urea herbicides by further reaction with ammonia or amines.

---

This application is a continuation-in-part of the earlier copending and now abandoned application, Ser. No. 436,913, filed Mar. 3, 1965, the disclosure of which is included herein by reference as fully as if set forth in its entirety.

This invention relates to a process for the production of new carbamyl halides and to the new carbamyl halides themselves.

It is known that in the reaction of N-(β-haloalkyl)-carbamyl halides with metal alcoholates, it is the halogen of the acid halide group which enters into reaction and not the halogen atom situated in β-position to the nitrogen atom.

We have now found that, surprisingly, carbamyl halides having the general formula:

$$R^2-\underset{\underset{\underset{R^4}{|}}{\overset{\overset{R^1}{|}}{C}-Y}}{\overset{|}{N-COX}}-A \qquad (I)$$

in which $R^1$ to $R^4$ may be identical or different and may denote hydrogen atoms, alkyl radicals or aryl radicals. $R^2$ and $R^3$ when taken together form an alkylene radical having two to five carbon atoms in which one methylene group may be replaced by an oxygen or sulfur atom or by the group N—$R^5$, in which $R^5$ denotes an alkyl, cycloalkyl or phenyl radical, X denotes chlorine or bromine,
Y denotes hydrogen or the radical A,
A may denote (1) the radical

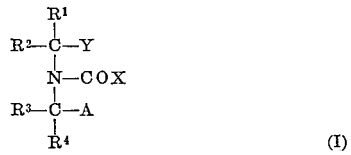

in which $R^6$, $R^7$ and $R^8$ each denote groups which activate hydrogen atoms, $R^6$ may additionally denote hydrogen, or alkyl, cycloalkyl or aralkyl, which may be substituted by 1 to 3 halogen atoms, or alkoxy, cyano or carboalkoxy groups; or may denote alkenyl or alkynyl in which the unsaturated bonds are in a position other than the α,β-position with reference to the carbon atom to which $R^6$ is attached, $R^7$ may additionally denote methyl or alkenyl having the olefinic bond in α,β-position to the carbon atom to which $R^7$ is attached, and may further denote hydrogen when $R^8$ denotes a nitro group or an acyl group, $R^7$ and $R^8$ may also be common members of a 5- to 8-membered carboxylic ring which has a carbonyl group in α-position to the carbon atom bearing $R^7$ and $R^8$, or (2) a nitrilo, thiocyanato, cyanato or isocyanato group or an alkynyl radical, having the triple bond in α,β-position with reference to the carbon atom to which A is attached, or (3) the radical —$ZR^9$ in which Z denotes oxygen or sulfur and
$R^9$ denotes an unsubstituted or substituted alkyl, alkenyl, alkynyl, aralkyl, aryl, alkaryl or cycloalkyl radical or the radical

in which $R^{10}$ denotes an unsubstituted or substituted alkyl, alkenyl, alkynyl, aralkyl, aryl, alkaryl or cycloalkyl radical and Z has the above meaning, are obtained when a carbamyl halide having the formula:

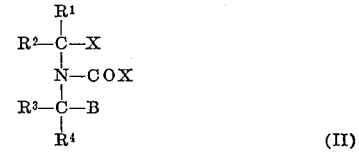

in which $R^1$ to $R^4$ and X have the above meanings and B denotes hydrogen, chlorine or bromine, is reacted with a compound having the formula:

<p style="text-align:right">HA   (III)</p> in which A has the meaning given above, or an alkali metal or alkaline earth metal salt thereof (i.e., a compound III wherein the hydrogen is replaced by an alkali or alkaline earth metal equivalent) at a temperature of from −40° to +150° C., with or without an organic solvent or suspension agent.

The reaction, for example when using N,N-bis-(chloromethyl)-carbamyl chloride and sodium methylate, may be represented by the following equation:

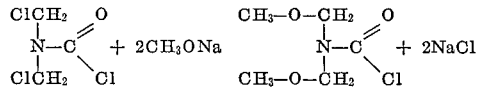

It is surprising that it is not the halogen atom of the acid halide group but the halogen atom situated in α-position to the nitrogen atom (i.e., not as in known cases) which reacts first.

Examples of initial materials having the general Formula II are: N-chloromethylmethylcarbamyl chloride, N,N-bis-(chloromethyl) - carbamyl chloride, N-α-chlorobenzyl-N-chloromethylcarbamyl chloride, N - (p-chloroα-chlorobenzyl)-N-chloromethylcarbamyl chloride, N-(α-chloromorpholyl)-carbamyl chloride, N - (α,α′-dichloropiperidyl)-carbamyl chloride, N-methyl-N-bromomethylcarbamyl bromide, N,N - bis - (bromomethyl)-carbamyl bromide, N,N-bis-(α-chloroisopropyl)-carbamyl chloride, N-(α,α′-dichlorothiomorpholyl)-carbamyl chloride, and 1- methyl-4-chloroformyl-3,5-dichloropiperazine. These substances may be readily prepared for example by the method described in German printed application No. 1,154,087.

It is a common feature of all of the compounds III having the formula HA that they have a reactive hydrogen atom which can be replaced by a metal to form a a salt. Although the compounds III belong to various classes of compounds their reaction with the initial compounds II results in all cases in the splitting off of hydrogen halide or a metal halide, substituted carbamyl halides being formed.

The compound III may be a C—H-acid substance, A in the Formula III having the meaning

or an alkali or alkaline earth metal salt thereof, preferably a sodium, potassium or lithium salt. Groups $R^6$, $R^7$ and $R^8$ which activate hydrogen atoms include according to this invention nitrilo, carboxylic ester or thiocarboxylic ester groups having 2 to 7 carbon atoms, such as carbalkoxy, thiocarbalkoxy or carboalkthio or the alkyl ester groups of dithiocarboxylic acids, and also carbamoyl groups in which the nitrogen atom may be substituted by one or two alkyl groups, acyl groups with 2 to 7 carbon atoms and hydrocarbon structure apart from the oxygen atom, formyl, nitro, sulfonyl or sulfonic acid alkyl ester groups, N,N-dialkyl-substituted sulfonamido groups or aryl radicals having 6 to 10 carbon atoms. The alkyl groups referred to in the above groups may contain from one to six carbon atoms in each case. In addition to the above-mentioned meanings for the radicals $R^6$, $R^7$ and $R^8$, the radical $R^6$ may also denote a hydrogen atom, an alkyl, cycloalkyl or aralkyl group, preferably with up to 12 carbon atoms, which may be substituted by 1 to 3 halogen atoms, alkoxy groups, preferably with 1 to 4 carbon atoms, carbalkoxy groups, preferably with 2 to 5 carbon atoms, or nitrilo groups, and further denote an alkenyl or alkynyl radical, preferably with 3 to 8 carbon atoms, in which the double bond or trible bond is not in $\alpha,\beta$-position to the carbon atom to which $R^6$ is attached. Moreover the radical $R^7$ may also denote the methyl group or an alkenyl group, preferably with 2 to 6 carbon atoms, which has an olefinic double bond in $\alpha,\beta$-position to the carbon atom to which $R^7$ is attached. Finally $R^7$ may denote a hydrogen atom when $R^8$ denotes an acyl group having 2 to 7 carbon atoms and having hydrocarbon structure apart from the acyl oxygen atom, or a nitro group.

Preferred salts of the said C—H-acid compounds III are the alkali metal salts, in particular the lithium, sodium and potassium salts.

Another class of suitable C—H-acid compounds III comprises cyanic acid, thiocyanic acid, hydrocyanic acid and isocyanic acid or alkynes, preferably with 2 to 8 carbon atoms, having an $\alpha$ triple bond. Of the salts of the said compounds the alkali metal salts are preferred.

For example the following C—H-acid compounds or their alkali metal salts may be used: hydrocyanic acid, thiocyanic acid, cyanic acid, isocyanic acid, acetylene, phenylacetylene, 3-methoxypropyne-(1), nitromethane, nitroethane, 2-nitropropane, acetone, acetophenone, cyclopentanone, cyclohexanone, methylcyclohexanones, methyl nitroacetate, nitroacetaldehyde, malodinitrile, malonodialdehyde, diethyl malonate, methyl cyanoacetate, methyl $\alpha$-butylcyanoacetate, diethyl $\alpha$-cyclohexyl malonate, methyl acetoacetate, acetylacetone ethyl acetamido malonate, methyl acetamidocyanoacetate, cyanoacetamide, benzoylacetone, benzyl cyanide, methyl p-toxylacetate, dibutyl acetone dicarboxylate, $\alpha$-picoline or quinaldine.

Alcohols or phenols as well as carboxylic acids or thiocarboxylic acids may be used as initial materials having the general formula III, A then having the meaning $ZR^9$. For example, the alcohols may be alkanols having one to fourteen carbon atoms, such as methanol, ethanol, isopropanol, butanol, 2-ethylhexanol or tridecanol, and also alkenols having three to eight carbon atoms, such as allyl alcohol or crotyl alcohol, or alkynols having three to eight carbon atoms, such as propargyl alcohol, methylbutynol, butynol or pentynol. Other suitable alcohols are aralkanols having for example seven to twelve carbon atoms, such as benzyl alcohol or $\alpha$- or $\beta$-phenylethanol, and cycloalkanols having for example five to fourteen carbon atoms, such as cyclahexanol, 4-methylcyclohexanol, cyclooctanol or cyclododecanol. Phenols with 6 to 14 carbon atoms may also be used as initial compounds III. Examples of suitable phenols are phenol itself, cresols, and naphthols. The said alcohols and phenols may contain 1 to 3 inert substituents or groups, such as halogen atoms, ether groups, tertiary amino groups or nitro groups. Examples of initial compounds III of this type include ethylene chlorohydrin, butylglycol (2-butoxyethanol), $\beta$-dimethylaminoethanol, p-nitrophenol, hydroquinone monomethyl ether, and p-chloro- and p-bromophenol.

Mercaptans may also be used as initial materials. In this case Z in the general Formula III denotes sulfur. Examples of mercaptans are alkylmercaptans having one to fourteen carbon atoms, such as methyl, ethyl, propyl, isopropyl, butyl, tertiarybutyl, isobutyl, sec.-butyl, 2-ethylhexyl, dodecyl and tridecyl mercaptan. Suitable alkenyl and alkynyl mercaptans with 3 to 8 carbon atoms include allyl and crotyl mercaptan, propargyl, methylbutynyl, butynyl and pentynyl mercaptan. Furthermore aralkyl mercaptans having for example seven to twelve carbon atoms, such as benzyl mercaptan, $\alpha$-phenylethyl mercaptan or $\beta$-phenylethyl mercaptan, and also cycloalkyl mercaptans having for example five to fourteen carbon atoms, such as cyclohexyl mercaptan, cyclooctyl mercaptan or cyclododecyl mercaptan, are suitable. Moreover aryl mercaptans with 6 to 10 carbon atoms may be used as the mercaptans, such as phenyl and p-tolyl mercaptan. The said mercaptans may contain 1 to 3 inert substituents or groups, such as halogen atoms, ether bridges, tertiary amino groups or nitro groups. Suitable substituted mercaptans are for example $\beta$-methylthio or $\beta$-methoxyethyl mercaptan, $\beta$-nitroethyl mercaptan, $\beta$-chloropropyl mercaptan, $\beta$-bromopropyl mercaptan, p-nitrophenyl, p-methoxyphenyl, p-chlorophenyl or p-bromophenyl mercaptan or p-dimethylaminothiophenol.

When A in Formula III denotes the radical

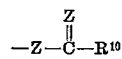

and both Z's denote oxygen, it will be seen that carboxylic acids may also be used as initial materials III. Saturated or olefinically or acetylenically unsaturated fatty acids having for example two to eight carbon atoms may be used as the carboxylic acids. Furthermore aryl carboxylic acids having for example seven to ten carbon atoms or cycloalkane carboxylic acids having for example six to thirteen carbon atoms are also suitable for the process. These carboxylic acids may also bear as substituents, one to three inert groups, such as alkyl with 1 to 4 carbon atoms, phenyl, nitro or dialkylamino groups with 2 to 8 carbon atoms or halogen atoms. Thus for example acetic acid, propionic acid, butyric acid, isobutyric acid, valeric acid, pavalic acid, monochloroacetic acid, dichloroacetic acid, trichloroacetic acid, $\gamma$-bromobutyric acid, $\epsilon$-chlorocaproic acid, 2-ethylhexane carboxylic acid, acrylic acid, methacrylic acid, crotonic acid, propiolic acid, p-dimethylaminobenzoic acid, m-nitrobenzoic acid, toluic acid, cyclohexane carboxylic acid, 2-methylcyclohexane carboxylic acid, or phenylacetic acid may be used.

Thiocarboxylic acids, i.e. thiol, thiono and dithio carboxylic acids may also be used. In this case A in Formula III denotes ZR$^9$ where R$^9$ stands for

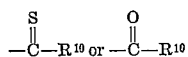

and Z represents oxygen or sulfur if R$^9$ stand for

or sulfur if R$^9$ stands for

R$^{10}$ has the same meaning as in the carboxylic acids.

Instead of the said alcohols, phenols, mercaptans, carboxylic acids and thiocarboxylic acids it is also possible to use their alkali metal or alkaline earth metal salts as initial materials, for example the sodium, potassium, lithium or calcium salts.

The reaction is carried out at temperatures of from $-40°$ to $+150°$ C., preferably at about room temperature. In general lower temperatures, for example $-40°$ to $+100°$ C., are adequate when using the metal salts, whereas when using the C—H-acid compounds somewhat higher temperatures, for example $-20°$ to $+150°$ C., are recommended. In cases where the reaction is exothermic, it is advantageous to cool during the reaction.

As the solvents or suspension agents those may be used which are inert, i.e. which react only slightly or not at all with the initial materials or end products. It is however possible to use those in which reaction of the initial materials proceeds more rapidly than any reaction with the solvent. Examples of suitable solvents or suspension agents are hydrocarbons, such as benzene, cyclohexane or xylene. If the reaction be carried out at the lower temperatures, it is also possible to use carbonamides, such as dimethylformamide or N-methylpyrrolidone. Furthermore the compound having the Formula III to be reacted may often be used in excess to serve as the solvent. Thus for example alcohols or solutions of alcoholates in alcohols or alcoholic suspensions of the alkali salts of C—H-acid compounds, prepared by reaction of alkali metal alcoholates in alcohols with the C—H-acid compounds, may be used.

In general 0.8 to 15 moles, preferably 1 to 3 moles, of the substance having the Formula III or a salt thereof is used for each halogen atom to be reacted. Obviously it is possible to use smaller amounts of the compound having the Formula III or its salts. If the compound III is a salt of a C—H-active substance, 0.8 to 1.3 moles is preferably used for each halogen atom to be reacted.

A procedure is preferred in which the compound having the Formula III or the dissolved or suspended salt is introduced into the α-halogen substituted carbamyl chloride at low temperature with slight cooling or gentle heating and the whole is allowed to react for from five minutes to six hours. If a carbamyl halide having the Formula II in which X and B are halogen atoms is being reacted, it is advantageous to use a salt of the compound having the Formula III.

The reaction mixture is fractionally distilled after the precipitated metal halide or the hydrogen halide has been separated. In general the solvent distills off first. The desired substituted carbamyl halide is obtained as the main fraction. Prior to the said separation, particularly when a metal salt of the compound III has been used in a stoichiometric excess, the reaction mixture may be acidified. Acidification, preferably with an anhydrous acid which is as volatile as possible, may be carried out for example by gassing hydrogen chloride into the reaction mixture.

The individual fractions exhibit characteristic refractive indexes by which the purity of the individual products may be determined.

The hitherto unknown carbamyl halides have the Formula I, where the substituents R$^1$ to R$^4$, A, X and Y have the meanings given in connection with the formula or by way of the description of the initial compounds III. They are valuable new intermediates, for example for the production of textile auxiliaries and plant protection agents. Thus the substituted ureas obtained by reacting the compounds I with ammonia, primary or secondary amines in conventional manner exhibit herbicidal activity.

The new carbamyl halides according to this invention may be reacted in a manner conventionally used for carbamyl halides with ammonia, primary and secondary amines in inert solvents, such as hydrocarbons or chlorohydrocarbons, and in the presence of acid-binding agents, e.g. tertiary amines, at 20° to 90° C. to form the desired ureas. The ureas generally remain dissolved in the hydrocarbon. After washing out the water-soluble hydrohalide of the tertiary amine the desired urea is obtained after the hydrocarbon has been concentrated.

The production of N-methyl-N-cyclohexoxymethyl-N'-phenyl urea is given below as a specific example:

61 parts by weight of N-methyl-N-cyclohexoxymethyl carbamyl chloride at 70° to 80° C. are dripped into a mixture of 40 parts by weights of triethylamine and 28 parts by weight of aniline in 200 parts by weight of cyclohexane. After 3 hours the whole is separated with 150 parts by weight of water, the cyclohexane layer is removed, dried and concentrated. Melting point 93° to 94° C. (recrystallized from cyclohexane).

The following are produced in an analogous manner:

N - (p - chlorophenyl)-N'-methyl-N'-propoxymethylurea, M.P. 74°–75°

N - cyclooctyl - N'-methyl-N'-butynoxymethylurea, M.P. 42°–43°

N-(p-ethylphenyl)-N'-methyl-N'-ethoxymethylurea, M.P. 49°–50°

N - (phenyl)-N'-methyl-N'-(β-chloroethoxy)-methylurea, M.P. 48°–50°

N - [p(p' - chlorophenoxy)-phenyl]-N'-methyl-N'-isobutoxymethylurea, M.P. 86°–87°

N - (p - chlorophenyl) - N'-methyl-N'-cyclohexoxymethylurea, M.P. 100°–101°

The use of substituted ureas of this type is described for example in U.S. Patent No. 3,125,601, Belgian Patents Nos. 681,248 and 682,399, and South African Patents Nos. 3231–66 and 3018–66. As regards the use of substituted ureas as herbicides reference is made to German Patents Nos. 968,273; 935,165; 1,017,406; 1,028,986; 1,062,059; 1,076,117; 1,188,861; 1,190,249; 1,204,015; 1,204,880; 1,204,879; 1,215,437; 1,110,465; 1,117,561; 1,108,977; 1,122,761; 1,142,251; 1,188,588; 1,192,454; 1,195,086; 1,200,062; 1,205,764; 1,206,201; 1,209,801; and U.S. Patents Nos. 3,127,263 and 2,655,445.

The invention is further illustrated by the following examples in which the parts given are parts by weight.

EXAMPLE 1

144 parts of a 30% solution in methanol of sodium methylate is slowly added at $-10°$ to 0° C. to 142 parts of N - chloromethyl - N - methyl-carbamyl chloride. The whole is then stirred for another three hours at 40° to 50° C., deposited common salt is filtered off and the filtrate is fractionally distilled over a sieve-plate column under sub-atmospheric pressure. The methanol is distilled off, and then the following fractions are obtained:

(1) 9 parts: boiling point at 15 mm. 62° to 68° C.; refractive index $n_D^{25}=1.445$.

(2) 91 parts: boiling point at 15 mm. 69° to 73° C.; refractive index $n_D^{25}=1.451$.

N-methyl-N-methoxymethylcarbamyl chloride.

(3) 22 parts: boiling point at 15 mm. 74° to 108° C.; refractive index $n_D^{25}=1.470$.

The first fraction consists mainly of methyl N-methyl-N-methoxycarbamate while the third fraction contains unreacted N-chloro-methyl-N-methylcarbamyl chloride. The yield of pure N-methyl-N-methoxymethylcarbamyl chloride is 85% of the theory with reference to the sodium methylate used.

EXAMPLE 2

1150 parts of a 30% solution in methanol of sodium methylate is slowly introduced into a mixture of 706 parts of N-bis-(chloromethyl)-carbamyl chloride and 500 parts of benzene, at $+5°$ to $+10°$ C., the whole is stirred for two hours at room temperature, the deposited common salt is suction filtered and the filtrate is fractionally distilled over a sieve-plate column under subatmospheric pressure. After the mixture of solvents benzene and methanol has been distilled off, the following fractions are obtained:

| Boiling point | Millimeter | Refractive index $n_D{}^{25}=$ |
|---|---|---|
| (1) 81° to 97° C | 28 | 1.433 |
| (2) 98° to 99° C | 25 | 1.439 |
| (3) 99° to 103° C | 25 | 1.439 |
| (4) 104° to 113° C | 23 | 1.489 |

Fractions (2) and (3) are pure N,N-bis-(methoxymethyl)-carbamyl chloride. The yield of the two fractions together is 78% of the theory with reference to the sodium methylate used.

Fraction (1) consists mainly of methyl N,N-bis-(methoxymethyl)-carbamate. Fraction (4) consists mainly of unreacted N,N-bis-(chloromethyl)-carbamyl chloride.

EXAMPLE 3

In a manner analogous to that described in Example 2, 13 parts of N,N-bis-(methoxymethyl)-carbamyl bromide having a boiling point of 116° to 118° C. at 29 mm. and a refractive index $n_D{}^{25}=1.441$ is obtained from 7 parts of magnesium methylate. dissolved in methanol, and 62 parts of N,N-bis-(bromomethyl)-carbamyl bromide. The yield is 76% of the theory with reference to the magnesium methylate used.

EXAMPLE 4

56 parts of potassium methylate, dissolved in 350 ml. of methanol, is slowly added while cooling with ice to a mixture of 231 parts of N-methyl-N-bromomethylcarbamyl bromide and 200 parts of cyclohexane. The potassium bromide is suction filtered and the filtrate is distilled over a bubble-tray column. 145 parts of N-methyl-N-methoxymethylcarbamyl bromide having a boiling point of 83° to 86° C. at 19 mm. and a refractive index $n_D{}^{25}=1.460$ is obtained. The yield is 78% of the theory with reference to the potassium methylate used.

EXAMPLE 5

246 parts of N-(3.5-dichloro-3,5-dimethylmorpholyl)-carbamyl chloride is dissolved in 500 parts of toluene and then at 30° to 35° C., with simultaneous cooling, 270 parts of 30% solution in methanol of sodium methylate is slowly added. The methanol and toluene are removed under subatmospheric pressure, deposited sodium chloride is suction filtered and the filtrate is fractionally distilled in an oil pump vacuum. 245 parts (69% of the theory with reference to methylate used) of N-(3,5-dimethoxy-3,5-dimethylmorpholyl)-carbamyl chloride is obtained having a boiling point of 126° to 129° C. at 19 to 20 mm. The yield is 69% of the theory with reference to sodium methylate used.

EXAMPLE 6

142 parts of N-methyl-N-chloromethylcarbamyl chloride is dissolved in 150 parts of xylene and at 40° to 50° C. a solution of the sodium salt of 2-ethylhexanol (23 parts of sodium in 320 parts of 2-ethylhexanol) in 350 parts of xylene is slowly added. The whole is stirred for another two hours at 50° to 60° C. The excess of 2-ethylhexanol and the xylene are removed under subatmospheric pressure. The sodium chloride is centrifuged off and the centrifugate is fractionally distilled over a column in an oil pump vacuum. 148 parts of N-methyl-N-(2-ethylhexoxymethyl)-carbamyl chloride is obtained having a boiling point of 139° to 142° C. at 1.5 mm. and a refractive index $n_D{}^{25}=1.445$. The yield is 63% of the theory with reference to the alcoholate used.

EXAMPLE 7

192 parts of methanol is slowly introduced into 71 parts of N-methyl-N-chloromethylcarbamyl chloride at 10° to 15° C. The whole is stirred for another four to five hours and the reaction product then slowly added to the top of a packed column and a water jet vacuum is applied. The product thus degassed and freed from solvent contains 92.5% of N-methyl-N-methoxymethylcarbamyl chloride according to chromatography (absorption at 150° C., 0.8 atmosphere gauge). The crude product may be further reacted direct.

EXAMPLE 8

320 parts of methanol is slowly introduced at 0° to $+10°$ C. into 185 parts of N-methyl-N-bromomethylcarbamyl chloride with gentle cooling. The whole is stirred at 10° to 20° C. for another one to two hours and all volatile constituents are removed in a water jet vacuum at 0° to $+5°$ C. The crude product is 93.3% pure according to gas chromatography. The yield is 130 parts, i.e. 88.5% of the theory with reference to a 100% product.

EXAMPLE 9

600 parts of methanol is slowly introduced at $+10°$ to $+20°$ C. into 176 parts of N-bis-(chloromethyl)-carbamyl chloride with efficient stirring and external cooling. The whole is further stirred for another six to eight hours. The crude reaction mixture is allowed to flow two or three times over a column filled with Raschig rings at room temperature in a water jet vacuum and an 86% crude N,N-bis-(methoxymethyl)-carbamyl chloride is obtained having a boiling point of 93° to 94° C. at 15 mm. and a refractive index of $n_D{}^{25}=1.44$. The yield is 149 parts, equivalent to 79% of the theory with reference to pure product.

EXAMPLE 10

140 parts of ethanol is slowly added at 10° to 15° C. to 142 parts of N-methyl-N-chloromethylcarbamyl chloride. While slightly cooling the reactor, the whole is stirred for another two to three hours. The excess of alcohol and the hydrogen chloride formed are removed by concentrating the crude reaction solution in a natural circulation evaporator (water jet vacuum).

The reaction solution is automatically cooled by the heat of evaporation so that the vaporization temperature does not exceed 15° to 20° C. 162 parts of a colorless crude product, refractive index=1.458 (82.5% pure according to gas chromatography) is obtained in a yield of 89% with reference to pure product. The product, N-ethoxymethyl-N-methylcarbamyl chloride has a refractive index of $n_D{}^{25}=1.447$ and boils at 93° to 95° C. at 25 mm.

EXAMPLE 11

710 parts of N-methyl-N-chloromethylcarbamyl chloride is slowly added at $+10°$ to $+20°$ C. to 1800 parts of isopropanol while cooling slightly. Dry air or nitrogen is bubbled through the reaction solution under a slight subatmospheric pressure during the addition in order to remove the hydrogen chloride formed from the reaction medium. Toward the end of the addition of the carbamyl halide, the whole is slowly heated up and the temperature is raised to 65° C. to 75° C. with simultaneous distillation of the excess isopropanol. The reaction mixture is then fractionally distilled. A small amount of first runnings and last runnings is obtained. The main fraction is 585 parts of N-isopropoxymethyl-N-methylcarbamyl chloride having a boiling point of 111° to 114° C. at 26 mm. and a refractive index of $n_D^{25}=1.443$. The yield is 84.5% of the theory with reference to N-methyl-N-chloromethylcarbamyl chloride used.

EXAMPLES 12 TO 35

In a manner analogous to that described in Example 11, N-propoxymethyl-N-methylcarbamyl chloride having the boiling point of 98° to 100° C. at 16 mm. and a refractive index $n_D^{25}=1.445$ is obtained from n-propanol and N-methyl-N-chloromethylcarbamyl chloride with a yield of 82%. If the hydrogen chloride formed be removed quickly and as completely as possible from the reaction mixture, the internal temperature during the removal of the excess alcohol may also be raised to 130° C.

The following products are obtained in an analogous way: B.P. denotes boiling point, the figure in brackets is the pressure in mm., and r.i. denotes the refractive index $n_D^{25}$.

13. N - methyl - N - (n-butoxymethyl)-carbamyl chloride; B.P. 118° to 120° C. (23); r.i.=1.4483.
14. N - methyl - N-(isobutoxymethyl)-carbamyl chloride; B.P. 114° to 116° C. (22); r.i.=1.4447.
15. N - methyl-N-(tertiary-butoxymethyl)-carbamyl chloride; B.P. 110° to 111° C. (18); r.i.=1.440.
16. N - (β-chloroethoxymethyl)-N-methylcarbamyl chloride; B.P. 85° to 88° C. (0.3); r.i.=1.4774.
17. N-(β-chloropropoxymethyl)-N-methylcarbamyl chloride; B.P. 81° to 84° C. (0.3); r.i.=1.471.
18. N - (propynoxymethyl) - N-methylcarbamyl chloride; B.P. 83° to 84° C. (2.0); r.i.=1.4756.
19. N - (1 - methylpropyne - (2) - oxymethyl)-N-methylcarbamyl chloride; B.P. 65° to 67° C. (0.5); r.i. =1.4678.
20. N - (1,1 - dimethylpropyne - (2)-oxymethyl)-N-methylcarbamyl chloride; B.P. 67° to 68° C. (0.5); r.i. =1.4652.
21. N - (propenoxymethyl)-N-methylcarbamyl chloride; B.P. 56° to 58° C. (0.5); r.i.=1.457.
22. N - (β - cyanoethoxymethyl)-N-methylcarbamyl chloride; B.P. 83° to 86° C. (0.2); r.i.=1.470.
23. N-(β-methoxyethoxymethyl)-N-methylcarbamyl chloride; B.P. 63° to 64° C. (0.3); r.i.=1.452.
24. N - (β-ethoxyethoxymethyl)-N-methylcarbamyl chloride; B.P. 65° to 67° C. (0.1); r.i.=1.454.
25. N-(β-propoxyethoxymethyl)-N-methylcarbamyl chloride; B.P. 69° to 71° C. (0.2); r.i.=1.457.
26. N - (1,3 - dichloroisopropoxymethyl) - N - methylcarbamyl chloride; B.P. 93° to 95° C. (0.4); r.i.=1.482.
27. N - (β-bromoethoxymethyl)-N-methylcarbamyl chloride; B.P. 87° to 89° C. (0.4); r.i.=1.479.
28. N - (2 - ethylhexoxymethyl)-N-methylcarbamyl chloride; B.P. 134° to 136° C. (22); r.i.=1.445.
29. N - (cyclohexoxymethyl)-N-carbamyl chloride; B.P. 121° to 123° C. (26); r.i.=1.442.
30. N - (tridecoxymethyl) - N - methylcarbamyl chloride; B.P. 104° to 106° C. (0.1); r.i.=1.441.
31. N - (β-phenylethoxymethyl)-N-methylcarbamyl chloride; B.P. 97° to 98° C. (0.3); r.i.=1.472.
32. N - (β,β,β-trichloroethoxymethyl)-N-methylcarbamyl chloride; B.P. 98° to 100° C. (0.3); r.i.=1.496.
33. N (α-methoxypiperidyl)-carbamyl chloride; B.P. 118° to 119° C. (20); r.i.=1.450.
34. N - (α - methoxymorpholyl)-carbamyl chloride; B.P. 121° to 123° C. (22);
35. N-ethyl-N-(α-methoxyethyl)-carbamyl chloride; B.P. 100° to 102° C. (26); r.i.=1.447.

EXAMPLE 36

95 parts of glacial acetic acid is added at −10° to 0° C. to 156 parts of N-(α-chloroethyl)-N-methylcarbamyl chloride slowly while stirring well and cooling. As soon as the reaction begins, a stream of dry nitrogen is bubbled through the solution. When all has been added, the temperature is allowed to rise slowly to 20° to 25° C. and vacuum is applied finally. Two hours later the whole is fractionally distilled. At a boiling point of 99° to 101° C., at 3.5 mm., 129 parts of N-methyl-N-(α-acetoxyethyl)-carbamyl chloride is obtained having a refractive index of $n_D^{25}=1.458$. The yield is 72% of the theory with reference to N-(α-chloroethyl)-N-methylcarbamyl chloride used.

EXAMPLE 37

71 parts of glacial acetic acid is slowly added with good stirring and cooling to 185 parts of N-methyl-N-bromomethylcarbamyl chloride at −20° to 0° C. Vacuum is applied to the reactor during the reaction and a current of dry air is passed through the reaction solution to remove hydrogen bromide formed. After the reaction is over, the temperature is allowed to rise slowly to 30° to 40° C. and remain thereat for a short time prior to fractionation. 139 parts of N-methyl-N-acetoxymethylcarbamyl chloride is obtained having a boiling point of 114° to 116° C. at 23 mm. and a refractive index of $n_D^{25}=1.457$. The yield is 69% of the theory with reference to the N-methyl-N-bromomethylcarbamyl chloride used.

EXAMPLE 38

70 parts of propionic acid is introduced with good stirring and slight cooling to 142 parts of N-methyl-N-chloromethylcarbamyl chloride at 10° to 20° C. After processing as described in Example 36, 112 parts of N-(α-propionyloxymethyl)-N-methylcarbamyl chloride is obtained having a boiling point of 92° to 94° C. at 1 mm. The yield is 62% of the theory with refrence to N-methyl-N-chloromethylcarbamyl chloride used.

EXAMPLE 39

110 parts of monochloroacetic acid is introduced at 0° to 10° C. into 143 parts of N-methyl-N-(chloromethyl)-carbamyl chloride with good stirring and moderate cooling, and the product is processed as in Example 36. 148 parts of N - (α-monochloroacetoxymethyl)-N-methylcarbamyl chloride is obtained having a boiling point of 88° to 89° C. at 0.5 mm. The yield is 74% of the theory with reference to N-methyl-N-(chloromethyl)-carbamyl chloride used.

EXAMPLES 40 to 45

A solution of 169 parts of sodium acetate in 680 parts of glacial acetic acid is introduced at 10° to 15° C. into 176 parts of N,N-bis-(chloromethyl)-carbamyl chloride. The whole is stirred vigorously for two hours and finally heated to 40° to 55° C. for one hour. The deposited sodium chloride is then suction filtered and the filtrate fractionally distilled. 142 parts of N,N-bis-(α-acetoxymethyl)-carbamyl chloride having a boiling point of 93° to 95° C. at 0.8 mm. is obtained. The yield is 63.5 % of the theory with reference to the N,N-bis-(chloromethyl)-carbamyl chloride used.

The following are obtained in an analogous way:

41. N-(α - acryloxymethyl)-N-methylcarbamyl chloride; boiling point 86° to 88° C. at 0.8 mm.
42. N - (α - trichloroacetoxymethyl)-N-methylcarbamyl chloride; boiling point 109° to 110° C. at 0.3 mm.
43. N-(α - acetoxypiperidyl)-carbamyl chloride; boiling point 890 to 90° C. at 0.1 mm.
44. N-(α - acetoxymorpholyl)-carbamyl chloride; boiling point 94° to 96° C. at 0.3 mm.
45. N - (methyl - N-acetothiomethyl)-carbamyl chloride; boiling point 106 to 107° C.

EXAMPLE 46

62 parts of methylmercaptan is slowly added to 142 parts of N-methyl-N-chloromethylcarbamyl chloride from a dropping funnel which is cooled well with solid carbon dioxide and whose outlet dips below the surface of the carbamyl chloride. The reaction temperature is kept between 10° and 25° C. by slight cooling. When all the mercaptan has been introduced, the whole is stirred for half an hour. Vacuum is then applied and the bulk of the dissolved hydrogen chloride is removed by a stream of dry nitrogen. 112 parts of N-methyl-N-methylthiocarbamyl chloride having a boiling point of 87° to 89° C. at 19 mm. is obtained by fractional distillation. The yield is 73% of the theory with reference to N-methyl-N-chloromethylcarbamyl chloride used.

EXAMPLE 47

50 parts of methylmercaptan is slowly introduced with cooling into a solution of 55 parts of sodium methylate in methanol. This mixture in turn is slowly introduced, with moderate cooling, into 185 parts of N-methyl-N-bromomethylcarbamyl chloride. The reaction temperature is +5° to +10° C. Excess methanol is then removed in vacuo and the residue is fractionally distilled. 142 parts of N-methyl-N-methylthiocarbamyl chloride having a boiling point of 99° to 101° C. at 26 mm. is obtained. The yield is 71.5% of the theory with reference to the N-methyl-N-bromomethylcarbamyl chloride used.

EXAMPLE 48

76 parts of isopropylmercaptan is added slowly to 128 parts of N-methyl-N-chloromethylcarbamyl chloride at 25° to 30° C. The whole is stirred for another three hours while applying a vacuum, passing a dry inert gas therethrough and warming slightly. N-methyl-N-isopropylthiocarbamyl chloride is obtained in a 78% yield. According to gas chromatography it is 86% pure and may be used direct for further reactions.

EXAMPLES 49 to 54

112 parts of well-cooled mercaptan is slowly added, as described in Example 46, to 176 parts of N,N-bis-(chloromethyl)-carbamyl chloride at 15° to 25° C. Reaction is allowed to continue for another six hours while applying a vacuum, passing a stream of dry inert gas therethrough and heating slightly. The residue is then fractionally distilled under subatmospheric pressure. 115 parts of N,N-bis-(methylthiomethyl)-carbamyl chloride having a boiling point of 106° to 109° C. at 18 mm. is obtained. The yield is 58% of the theory with reference to the N,N-bis-(chloromethyl)-carbamyl chloride used. The following are obtained in an analogous way:

50. N-ethylthiomethylcarbamyl chloride; boiling point 94° to 95° C. at 18 mm.
51. N-methyl-N-benzylthiomethylcarbamyl chloride; boiling point 100° to 101° C. at 0.1 mm.
52. N-methyl-N-laurylthiomethylcarbamyl chloride; boiling point 112° to 114° C. at 0.2 mm.
53. N-($\alpha$-methylthiopiperidyl)-carbamyl chloride; boiling point 86° to 87° C. at 0.3 mm.
54. N-($\alpha$-methylthiomorpholyl)-carbamyl chloride; boiling point 97° to 98° C. at 0.5 mm.

EXAMPLE 55

180 parts of a 30% by weight solution of sodium methylate in methanol is slowly added at 0° C. to 160 parts of diethyl malonate. The methanol solution obtained is introduced slowly at 0° to +15° C. into 142 parts of N-methyl-N-chloromethylcarbamyl chloride. After the whole has been added and acidification has been carried out with a little hydrogen chloride gas, the excess of methanol is immediately distilled off under subatmospheric pressure, the deposited sodium chloride is suction filtered and the remainder is fractionally distilled. 190 parts of N-methyl-N-[$\beta$-di-(carbethoxy)-ethyl]-carbamyl chloride is obtained having a boiling point of 47° to 48° C. at 0.2 mm. The yield is 71.5% of the theory with reference to N-methyl-N-chloromethylcarbamyl chloride used.

EXAMPLE 56

180 parts of a 30% by weight solution of sodium methylate in methanol is added slowly at +10° to +25° C. to 61 parts of nitromethane. This solution is allowed to flow at 0° to +20° C. into 142 parts of N-methyl-N-chloromethylcarbamyl chloride. When the reaction is over, hydrogen chloride gas is passed in at 0° to 20° C. until the solution has an acid reaction, excess solvent is removed under subatmospheric pressure and the remainder is fractionated over a short column. 126 parts of N-($\beta$-nitroethyl)-N-methylcarbamyl chloride having a boiling point of 59° to 61° C. at 2.0 mm. is obtained. The yield is 76% of the theory with reference to N-methyl-N-chloromethylcarbamyl chloride used.

EXAMPLE 57

145 parts of potassium thiocyanate (dissolved in acetone) is slowly added to 278 parts of N-methyl-N-bromomethylcarbamyl chloride at −10° to +15° C. The solvent is distilled off under subatmospheric pressure and deposited potassium bromide is centrifuged off. The product is N-thiocyanomethyl-N-methylcarbamyl chloride and is a reddish yellow oil. It decomposes when distilled under subatmospheric pressure.

EXAMPLE 58

A solution in methanol of the sodium salt of methyl cyanoacetate (prepared from 180 parts of a 30% by weight solution of sodium methylate in methanol and 99 parts of methyl cyanoacetate) is slowly introduced at +10° to +20° C. into 142 parts of N-methyl-N-chloromethylcarbamyl chloride. Excess methanol is removed under subatmospheric pressure and deposited sodium chloride is suction filtered. The whole is heated for two hours at 50° to 70° C., again suction filtered and fractionally distilled. A fraction is obtained which distills over at a boiling point of 45° to 47° C. at 0.3 mm. The yield is 141 parts of N-methyl-N-($\beta$-carbmethoxy-$\beta$-cyanoethyl)-carbamyl chloride, equivalent to 69% of the theory with reference to the N-methyl-N-chloromethylcarbamyl chloride used.

EXAMPLE 59

30 parts of hydrocyanic acid is slowly gassed into 142 parts of N-methyl-N-chloromethylcarbamyl chloride at +5° to +10° C. The temperature is slowly raised to 65° to 95° C. and dry nitrogen is allowed to stream through the solution. The solution is then freed from excess hydrocyanic acid under subatmospheric pressure by passing a stream of dry nitrogen therethrough, and rectified.

79.5 parts of N-(cyanomethyl)-N-methylcarbamyl chloride having a boiling point of 84° to 86° C. is obtained. The yield is 61% of the theory, with reference to the N-methyl-N-chloromethylcarbamyl chloride used.

The following are obtained in an analogous way:

N-($\beta$-carbethoxy) - $\beta$ - (ketomethyl)-ethyl N-methylcarbamyl chloride having a boiling point of 59° to 60° C. at 0.4 mm. from N-methyl-N-bromomethylcarbamyl chloride and ethyl sodium acetoacetate;

N-methyl-N-propyn-(2)-yl-(1)-carbamyl chloride having a boiling point of 67° to 68° C. at 29 mm. from sodium acetylide and N-methyl-N-chloromethylcarbamyl chloride;

N-[$\alpha$-(cyanobenzyl)-]piperidylcarbamyl chloride having a boiling point of 108° to 110° C. at 0.3 mm. from benzyl cyanide, sodium methylate and $\alpha$-chloropiperidylcarbamyl chloride;

N-methyl-N-($\alpha$-ketocyclohexylmethyl)-carbamyl chloride having a boiling point of 63° to 65° C. at 0.5 mm. from cyclohexanone, sodium methylate and N-methyl-N-bromomethylcarbamyl bromide;

N-[$\alpha$-(dicyanomethyl)]-morpholylcarbamyl chloride having a boiling point of 91° to 93° C. at 0.2 mm. from malodinitrile, potassium methylate and $\alpha$-chloromorpholylcarbamyl chloride.

EXAMPLE 60

215 parts of potassium thiocyanate (dissolved in acetone) is slowly added at 20° to 35° C. to 176 parts of N,N-bis-(chloromethyl)-carbamyl chloride. The whole is heated for three hours under reflux, deposited potassium chloride is suction filtered, the solvent removed under sub-atmospheric pressure, and crude N,N-bis-(thiocyanato-methyl)-carbamyl chloride is obtained as a reddish yellow oil which decomposes when distilled under subatmospheric pressure.

We claim:

1. A process for the production of a carbamyl halide having the formula $$\begin{array}{c} CH_3 \\ | \\ N-COX \\ | \\ CH_2-OR \end{array}$$

in which

X denotes a member selected from the class consisting of chlorine and bromine, and R denotes a radical selected from the class consisting of alkyl of 1 to 14 carbon atoms, alkenyl of 3 to 8 carbon atoms, alkynyl of 3 to 8 carbon atoms, aralkyl of 7 to 12 carbon atoms, cycloalkyl of 5 to 14 carbon atoms, and each of the foregoing radicals substituted by 1 to 3 chlorine or bromine atoms;

which process comprises: reacting a carbamyl halide of the formula $$\begin{array}{c} CH_3 \\ | \\ N-COX \\ | \\ CH_2X \end{array}$$

in which X has the meaning given above, with a compound selected from the class consisting of alcohols of the formula ROH in which R has the meaning given above and the alkali metal and alkaline earth metal alcoholates of said alcohol, at a temperature of between −40° C. and +150° C.

References Cited

UNITED STATES PATENTS 2,409,829  10/1946  Boon _____ 260—553

ALEX MAZEL, Primary Examiner

R. T. GALLAGHER, Assistant Examiner

U.S. Cl. X.R.

71—119, 120; 260—243, 247.1, 247.2, 268, 293.4, 294, 294.3, 454, 455, 465.4, 482, 486, 487, 493, 553